Sept. 29, 1964

B. L. DE MARE 3,150,450

BOREGAGE

Filed April 11, 1962

Baltzar Leo De Mare
BY
S.J. Rotondi & A.J. Dupont

Sept. 29, 1964  B. L. DE MARE  3,150,450
BOREGAGE
Filed April 11, 1962  3 Sheets-Sheet 2
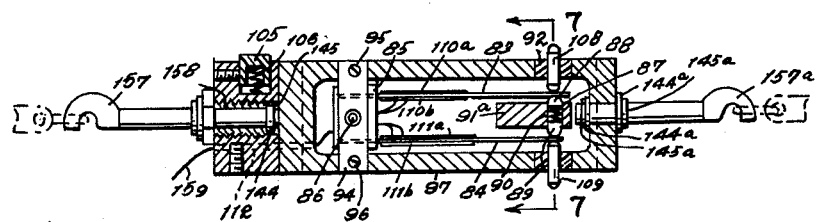
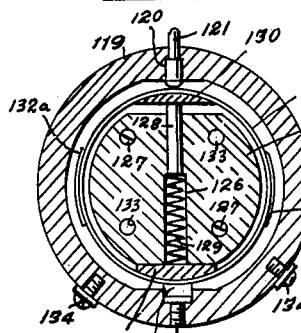
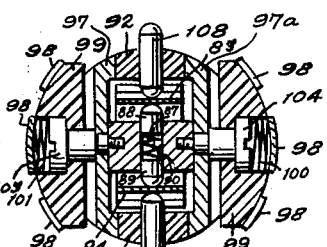
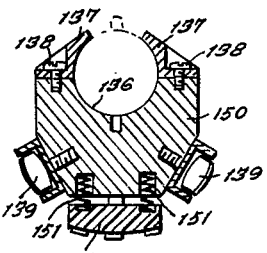
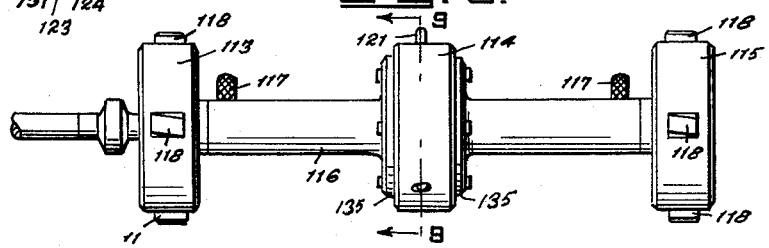
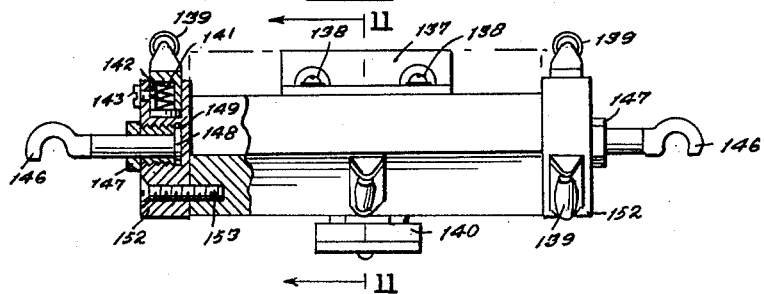
INVENTOR.
Baltzar Leo DeMare
BY
S. J. Rotondi & A. J. Dupont

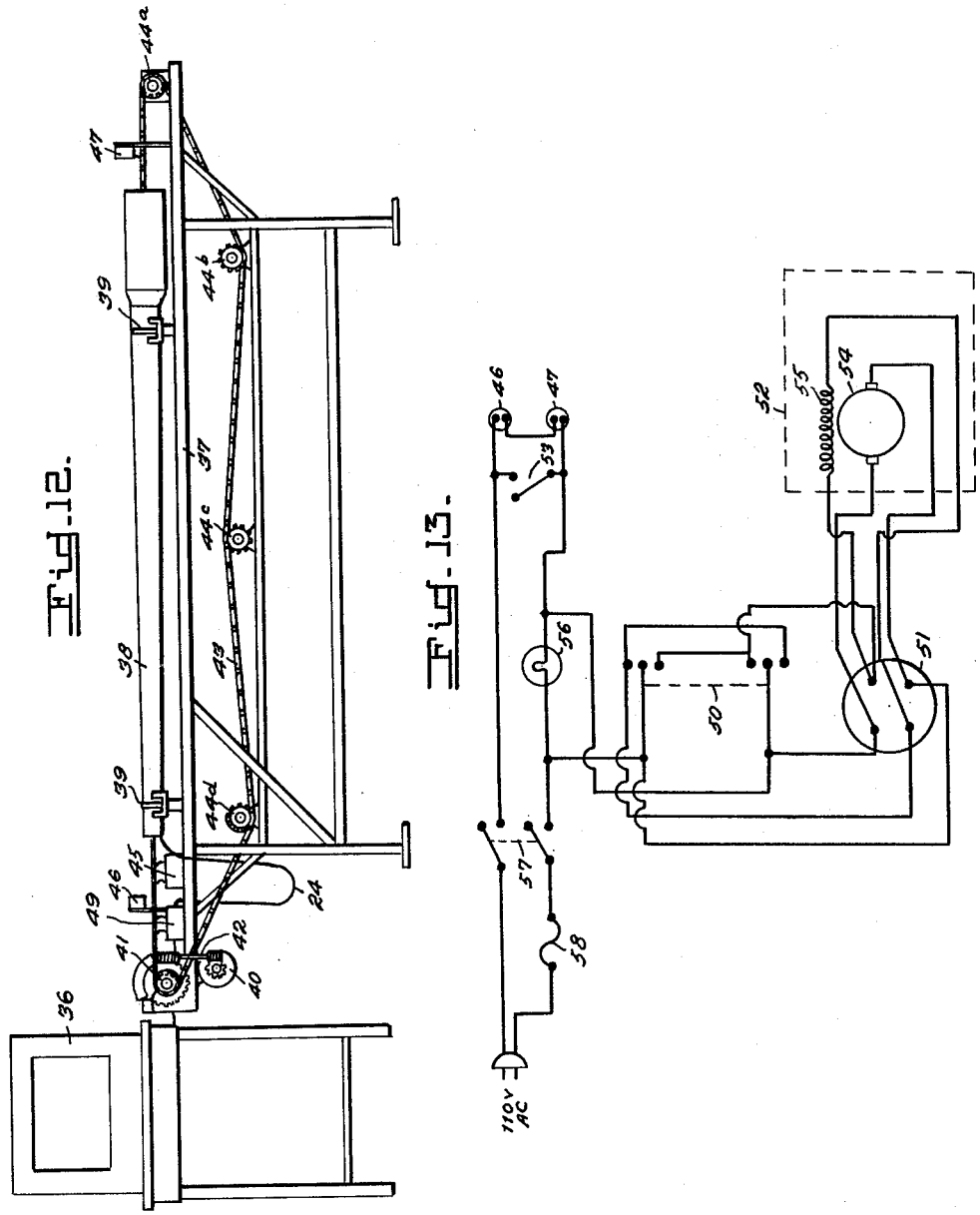

3,150,450
BOREGAGE
Baltzar Leo De Mare, Aberdeen, Md., assignor to the United States of America as represented by the Secretary of the Army
Filed Apr. 11, 1962, Ser. No. 187,179
5 Claims. (Cl. 33—178)
(Granted under Title 35, U.S. Code (1952), sec. 266)

The invention described herein may be manufactured and used by or for the Government for governmental purposes without the payment to me of any royalty thereon.

This invention relates to a boregage and more particularly to a device for accurately measuring the bore diameter of a gun tube to determine erosion in the tube.

Previous methods of studying the erosion action of propellants upon the bore of a gun, especially in the region of the origin of rifling, necessitated many firings and subsequent measurements to determine changes in bore diameters, land and groove contours. The most generally used method is star-gaging which is a lengthy and expensive process requiring the services of at least two men.

Moreover, since measurements in the previous methods were made as discrete intervals along the bore, significant details could be missed and hence the methods were not always fully informative.

The present invention consists of a sensing head which is drawn through the tube to be measured by means of a motor driven chain, or cable. The electrical output of the sensing head is fed to an electronic recorder through a Wheastone bridge.

It is a primary object of this invention to provide a device whereby continuous measurements of gun tube bore diameters and land profiles can be obtained.

Another object of the present invention is a boregage system which provides a permanent record of its measurements.

A further object is a device to measure gun bore diameters having a range from less than one inch to several inches.

Still another object of the present invention is a rugged boregage having an extremely high degree of accuracy.

A final object is a gun tube boregage adapted to measure land or groove profiles in the rifling in gun tube bores having either constant or increasing angles of twist.

Other objects and advantages of the present invention will hereinafter become more fully apparent from the following description of the annexed drawings which illustrate a preferred embodiment thereof and wherein:

FIGURE 6 is an axial section of a modified form of boregage employing a double cantilever arrangement;

FIGURE 7 is a cross section view taken along lines 7—7 of FIGURE 6;

FIGURE 8 is an axial section of a modified form of boregage for use with medium and large caliber gun tubes;

FIGURE 9 is a cross section view taken along lines 9—9 of FIGURE 8;

FIGURE 10 is a side elevation, partly in section, and showing an adapter for use with the boregage of FIGURE 1;

FIGURE 11 is a cross section view taken along lines 11—11 of FIGURE 10;

FIGURE 12 illustrates a translating mechanism and gun support for use with small caliber gun tubes, and FIGURE 13 is a diagram of the electrical circuit of the driving means of the translating mechanism of FIGURE 12.

Figure 1:
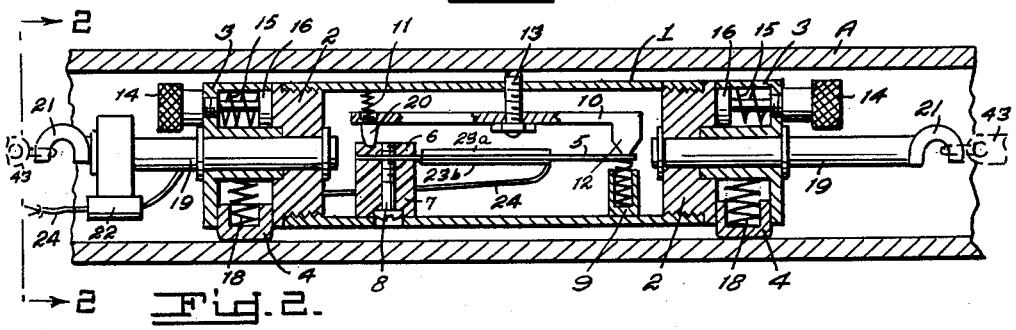
FIGURE 1 is an axial section of the boregage of the invention for use in small caliber gun tubes.
Figure 2:
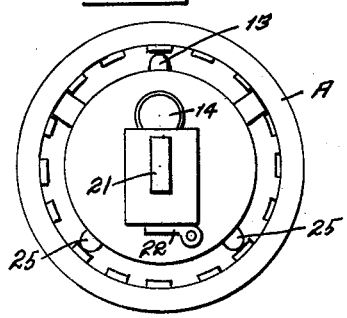
FIGURE 2 is an end view looking in the direction of the arrows as indicated on FIGURE 1.

Referring now in greater detail to the drawings, there is shown in FIGURES 1 and 2 a general embodiment of the boregage of this invention and is shown in these figures as applied in a gun tube A. The boregage has a tubular housing 1. The ends of housing 1 are closed by disc shaped members 2 which are threadedly fixed to each end thereof. Cylindrical detent housings 3 are rotatably mounted to each end closure 2 and each detent housing 3 has three detent guides 4 which are radially mounted therein and are spaced 120° apart.

Disc shaped members 2 and detent housings 3 are of equal diameter relative to cylindrical housing 1 thereby providing a continuous and smooth outer surface to the boregage.

A cantilever beam 5 is rigidly fixed at one of its ends between blocks 6 and 7 which are held together by screw 8. Blocks 6 and 7 are fixed to tubular housing 1 by screws.

An upward force is applied to beam 5 by a spring 9. (See FIGURE 1.)

A downward force may be applied to beam 5 by a lever 10 which is provided with a knife edge 20 integral with one of its ends. Knife edge 20 rests in a recess provided in block 6 and is held therein by pressure of a spring 11. A protruding portion 12 is provided at its free end and rests on lever 5. A follower 13 is provided on lever 10 and extends upwardly to pierce tubular housing 1 and extends beyond for the purpose of scanning the surface of the gun bore of gun A when the boregage is translated through the gun bore.

Each detent housing 3, which is rotatable, can be rotated and locked in either of two positions 15° apart by means of a spring loaded detent consisting of a plunger 14, a spring 15 and a locking disc 16.

Detent guides 4, which are preferably of nylon, are maintained in the grooves of the gun tube A by springs 18.

A shaft 19 is secured axially in each disc 2 and housing 3 and serves as an axle for the housings 3 to rotate thereon. Each shaft extends outwardly from the housings 3 and is provided with a clevis 21.

A clip 22 is secured on shaft 19 for supporting electrical leads 24 which electrically connect a pair of strain gages 23a and 23b which are carried by the upper and lower sides of beam 5 respectively. Leads 24 are also in connection with an electric measuring circuit to be described later.

A plurality of fixed feet 25 (see FIGURE 2) are provided and are detachably secured to tubular housing 1 and are in the same plane as follower 13. Feet 25 may be of two lengths, one for groove scanning and one for land scanning. Two feet 25 are shown in FIGURE 2, although more can be used as is expedient.

Figure 3:
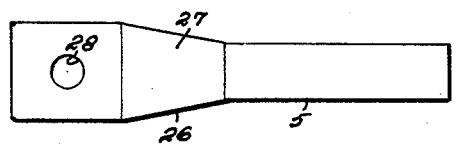
FIGURE 3 is a top plan view of the cantilever beam embodied in the boregage of FIGURE 1.

Cantilever beam 5 (see FIGURE 3) is formed with converging shoulders 26 thereby providing a region of constant stress 27. Strain gages 23a and 23b are located within this region. A hole 28 in the larger portion of beam 5 receives screw 8 which secures the beam 5 between blocks 6 and 7.

Figure 4:
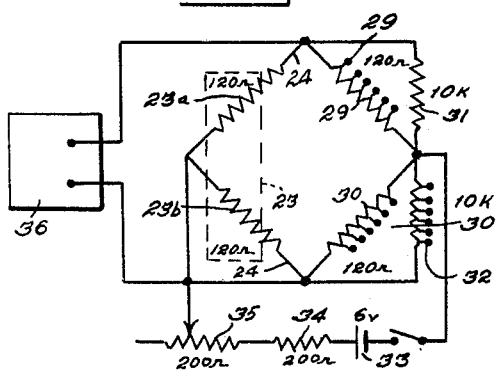
FIGURE 4 illustrates the strain gage circuit employed with the boregage.

The circuitry by which measurements are made by the boregage is shown in the diagram of FIGURE 4. Strain gages 23a and 23b in an area designated by broken lines 23, and constituting the active arms of a Wheatstone bridge, are connected by leads 24 to the passive arms. A 120 ohm decade box 29 in parallel with a 10K resistor 31 and a 120 ohm decade box 30 in parallel with a 10K decade box 32 form the passive arms of the bridge circuit. A variable power supply is provided by a 6 volt storage battery 33 in series with a 200 ohm fixed resistor 34 and a 200 ohm variable resistor 35. The output of the bridge circuit is recorded by a Weston 670 1 type recorder 36. Means are provided for translating the boregage throughout the length of gun barrel bore. A translating means is shown in FIGURES 12 and 13 by way of example, though other expedient means may be used, especially with very large gun barrels. The means illustrated in FIGURE 12 consists of a steel A-frame 37 on which is mounted the necessary control equipment. A gun tube 38, whose bore is to be scanned by the boregage of the invention, is supported on frame 37 by a pair of spaced, adjustable V-blocks 39. An electric motor 40, connected to a drive sprocket 41 by a worm gear 42 drives a roller chain 43 on idler sprockets 44a, 44b, 44c, and 44d. A motor control 45 and limit switches 46 and 47 control the operation of the roller chain 43 to which the boregage of the invention (not shown in this figure) is attached. The roller chain 43 is attached to the clevis 21 at each end of the boregage. Travel calibration of the boregage is provided for by a microswitch 48. The measuring apparatus comprises the lead 24, strain patch circuit 49 and recorder 36.

The electrical circuit of the translating means is shown in the diagram of FIGURE 13 and comprises a two way toggle switch 50 providing forward and reverse motion, a Jones plug 51, and a ½₀ horsepower ratio-motor 52 having an armature 54 and field 55. Limit switches 46 and 47 open the circuit when the boregage has completed a trip through the bore of gun 38. An overide switch 53 provides a means for energizing the motor circuit, when it has been opened by a limit switch 46 or 47 to permit reversing of the direction of travel. An indicator light 56 will always be on when motor 52 is operating. A switch 57 provides means of opening and closing of the circuit and a fuze 58 provides a safety means for the circuit.

Figure 5:
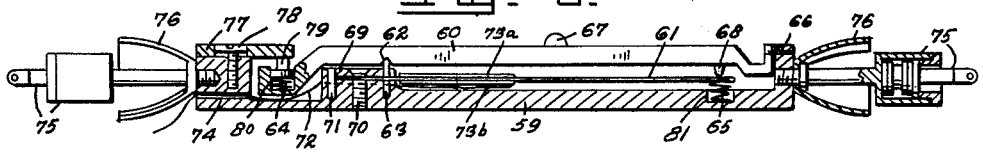
FIGURE 5 is an axial section of a modified boregage for use in very small caliber gun tubes.

A modified form of boregage is illustrated in FIGURE 5 and is for use in scanning the bores of guns of small caliber and consists of a semicircular body 59 to which is attached a lever 60. A follower 67 is integral with the top side of lever 60. A protrusion 68 integral with the underside of lever 60 contacts a strain beam 61. Lever 60 is provided with a recess 62 which receives a pivot 63 fixed in body 59. A counter clockwise force is applied to lever 60 by a spring 64 in a recess 80. A spring 65 in a recess 81 in body 59 biases beam 61 against protrusion 68 thus insuring contact by follower 67 against the inner periphery of a gun bore (not shown in FIGURE 5).

A slot 66 prevents lateral movement of lever 60 as well as providing resilient attachment of lever 60 to body 59.

Strain beam 61 is rigidly fixed to body 59 by a block 69, screw 70, pin 71 and pivot pin 63.

Electrical leads 72 are attached to a pair of strain gages 73a and 73b fixed, one each, on either side of beam 61 and are fed through a bore 74 in body 59. A drawbar and thrust bearing assembly 75 threadably mounts Phosphor bronze supporting springs 76 to each end of body 59. Springs 76 perform the same function as detent guides 4 of FIGURES 1 and 2. A crown shaped member 77 fixed to housing 59 by screw 78 provides a seat for a stud 79 which supports one end of spring 64 which is seated in recess 80.

Another modified form of boregage is illustrated in FIGURES 6 and 7. This embodiment employs dual strain beams 83 and 84 and are secured at one of their ends in a block 85 which are, in turn, pivotably mounted by ball bearings 86 to a support 94.

Support 94 is secured to the inner side of one half of the boregage housing 97 which is formed of two halves 97 and 97a as seen in FIGURE 7.

Strain beams 83 and 84 are held in a centrally disposed position by the action of a spring 87 which biases a pair of studs 88 and 89 slidably mounted in a bore 90 of a support 91a.

A pair of followers 108 and 109 are slidably mounted in Teflon bushings 92 and 93 in boregage housing 97 and contact strain beams 83 and 84. With this arrangement, only changes in the bore diameter are recorded.

The boregage of FIGURES 6 and 7 is provided with guides 99, best seen in FIGURE 7 and are made of Teflon. Guides 99 are biased outwardly from housing 97 by springs 100 and 101. The outer surface of guides 99 are provided with bosses 98. Guides 99 are in the same traverse plane as followers 108 and 109. The guides 99 are made in interchangeable sets so that both lands and grooves of a gun rifling can be engaged. Also the boregage of FIGURES 6 and 7 may be used with gaintwist rifling. For the purpose of readily interchanging guides 99, the guides are secured to the boregage housing 97 by screws 103 and 104.

Teflon supports 105 are provided in this embodiment and are biased outwardly by springs 106 (one support being shown in FIGURE 6).

Clevises 157 and 157a are provided for pulling the boregage through a gun barrel (not shown). One clevis, 157, is secured to the boregage by a threaded sleeve 158 in contact with a washer 144 which is held by a snap ring 145 on the end of the clevis 157. The other clevis, 157a, is secured to the boregage by two washers 144a and two snap rings 145a. An electrical lead 159 from strain patches 110a, 110b, 111a, and 111b, passes through a bore 112 to the recording equipment. (Not shown in FIGURES 6 and 7.)

A still further modified form of boregage is illustrated in FIGURES 8 and 9 and is for use with guns of large caliber. In this embodiment, three disc-shaped bodies 113, 114 and 115 are mounted on a rigid shaft 116. Bodies 113 and 115 on either end of shaft 116 are rotatably mounted to enable the instrument to scan either lands or grooves and may be set against rotation by set screws 117. Guides 118, of Teflon, are provided on the circumferential surface of bodies 113 and 115.

The central body 114 contains a ring type sensing element, as seen in FIGURE 9 and comprises a cup-shaped gage housing 119 having a bore 120 in the wall thereof in which a follower 121 is slidably mounted.

A thin metallic ring 122, centrally disposed in cup-shaped housing 119 is supported by an adjusting pad 123 and an adjusting screw 124. A metallic disc 125 having a diametrical bore 126 of two different diameters is secured in housing 119 by screws 127. A rod 128 is secured in a smaller portion of bore 126 and has a crown shaped member 130 fixed on its outer end. A spring 129 in the larger portion of bore 126 maintains an outer force on ring 122 at a point where follower 121 makes contact therewith.

Another crown shaped member 131 disposed in diametrically opposed relation with respect to member 130 is located between ring 122 and disc 125 and serves as a padding against which the adjusting pad 123 can exert a pressure to rigidly fix ring 122.

A pair of strain patches 132a and 132b are fixed to the outer circumferential surface of ring 122 and are spaced approximately 90° of an arc from adjusting pad 123. Cover plates 135 are fixed to the housing 119 by screws which fit into sockets 133. Housing 119 is also provided with threaded bores for supporting buttons 134.

FIGURES 10 and 11 illustrate an adapter for the basic boregage of FIGURES 1 and 2 to permit its use in large caliber guns. The boregage of FIGURES 1 and 2, with clevises 21 and 22 and guides 4 removed, is placed in a circular recessed portion 136 in the housing 150 of the adapter and is held firmly by curbed clamps 137 secured to the housing 150 of the adapter by screws 138. A plurality of ball bearing rollers 139 mounted to body 150 provide support for adapter housing 150 when used in a gun bore. A single guide 140 is biased by springs 151.

Rollers 139 are biased by springs 141 and are provided with a stop 142 and a retaining screw 143. Clevises 146 are fixed to the adapter by a sleeve 147, washers 148 and snap rings 149 in a similar manner. End portions 152 are secured to housing 150 by screws 153.

The operation of the boregage of the invention is the same in all forms described and shown, and is best shown in FIGURES 1 and 12. The boregage to be used is attached to roller chain or cable 43 of the translating mechanism of FIGURE 2 and is moved so as to be positioned in one end of the bore of the gun being tested.

Motor 40 is then energized and pulls the roller chain or cable 43 and boregage which rotates with the rifling (not shown in these figures) of the gun tube. The boregage travels through the gun bore and the follower (indicated by 13 in FIGURE 1) rides on either a land or groove of the rifling, depending upon the operator's selection and deflects the cantilever beam (indicated by 5 in FIGURE 1) thereby causing the strain patch (indicated by 23a and 23b in FIGURE 1) resistances to increase or decrease. These changes of resistance cause various states of unbalance in the Wheatstone bridge circuit (shown in FIGURE 4) which will be detected by the recorder 36. The boregage will be automatically stopped at either end of its travel through the gun bore by limit switches 46 and 47. The override switch 53 is used to "back the boregage away from the limit switches 46 or 47, or to reverse the direction of travel of the boregage."

The "single action" boregages shown in FIGURES 1, 5 and 8 can measure any hill or valley in a particular land or groove. The "double action" boregage of FIGURE 8 does not measure hills or valleys of rifling, but rather any change in the inner diameter of the gun tube.

It is therefore apparent that an accurate boregage has been devised and one that is simple of construction and operation in that it provides a means of scanning the entire length of the lands and grooves of a gun barrel rifling in a single operation and by a single operator.

Variations and modifications may be effected without departing from the scope of the novel concept of the present invention as set forth in the appended claims:

What is claimed is:

1. In an apparatus for measuring the land and groove profile of a rifled gun bore, the combination comprising, a boregage adapted to be pulled in either direction through said gun bore for continuously measuring the land and groove profile of the rifling of said gun bore and a power driven mechanism connected to each end of said boregage in either direction continuously through said bore; said boregage comprising a body, a closure threadably fixed to each end of said body, a shaft axially mounted in each closure, a detent housing rotatably mounted on each shaft, a plurality of spring loaded guides adapted to ride in the grooves of said gun bore rifling, said guides being mounted in spaced radial relation in said detent housings, each said guide being spaced 120° apart from each other, a spring loaded locking member in each said detent housing, each said spring loaded locking member adapted to rotate its respective said detent housing with respect to said gun bore rifling and including a spring loaded plunger having a disc integral with its inner end and in frictional engagement with the outer face of a respective closure whereby said detent housing may be rotated and frictionally locked in one of two positions apart, at least one cantilever beam secured at one of its ends in said body, a strain patch gage carried by each side of said cantilever beam, a lever pivotally mounted in said body, the free end of said lever resting on the free end of said cantilever beam, a follower fixed to said lever and protruding through said body, a spring fixed in said body and biasing said cantilever beam in a direction to cause said follower to contact the surface of a land or groove in said gun bore rifling, a plurality of spaced feet fixed on the outer peripheral surface of said body and lying in the same cross sectional plane as said follower whereby said feet may ride in a groove or land of the gun bore rifling when said detent housings are adjusted by said locking detent.

2. In a device as set forth in claim 1 wherein said body is tubular.

3. In a device as set forth in claim 1 wherein said body is semicircular.

4. In a device as set forth in claim 1 wherein said body is cup shaped.

5. A device as claimed in claim 1 wherein said power driven mechanism for pulling said boregage in either direction through said bore comprises, a frame for supporting a gun in a horizontal position thereon, a motor supported at one end of said frame, a drive sprocket supported by said frame and located at one end of said gun and in spaced relation therefrom, a plurality of spaced idler sprockets carried by said frame below said gun, a single idler sprocket on said frame and disposed in spaced relation from the other end of said gun, a chain in mesh with said drive sprocket and said idler sprockets or a cable, said chain or cable being connected at each of its ends to said boregage, whereby when said motor is energized, said boregage will be translated through said bore, a first limit switch on said frame between said drive sprocket and said gun, a second limit switch on said frame between said idler sprocket and said gun, said limit switch adapted to limit the travel of said boregage at each end of said bore and an over ride switch on said frame, said last named switch acting to reverse the travel of said boregage after contacting a said limit switch, said limit and said over ride switches being in electrical circuit with said motor.

References Cited in the file of this patent

UNITED STATES PATENTS

| | | |
|---|---|---|
| 428,886 | Brown | May 27, 1890 |
| 2,025,575 | Danz | Dec. 24, 1935 |
| 2,565,844 | Eisele | Aug. 28, 1951 |
| 2,607,128 | Newhall | Aug. 19, 1952 |

FOREIGN PATENTS

| | | |
|---|---|---|
| 614,136 | Great Britain | Dec. 9, 1948 |